United States Patent [19]

Baron

[11] Patent Number: 4,708,547
[45] Date of Patent: Nov. 24, 1987

[54] SAFETY TOOL-HOLDER FOR MACHINE-TOOLS

[75] Inventor: Claude Baron, Couëron, France

[73] Assignee: Societe Nationale Industrielle et Aerospatiale, Paris, France

[21] Appl. No.: 918,394

[22] Filed: Oct. 14, 1986

[30] Foreign Application Priority Data

Oct. 14, 1985 [FR] France ................. 85 15201

[51] Int. Cl.$^4$ ............................. B23C 7/00
[52] U.S. Cl. ................................... 409/233
[58] Field of Search ............ 409/233, 232, 234, 134; 408/239 R, 238; 279/8

[56] References Cited

U.S. PATENT DOCUMENTS

| | | | |
|---|---|---|---|
| 3,520,228 | 7/1970 | Wohlfeil | 409/231 |
| 3,603,203 | 9/1971 | Rhodes | 409/232 |
| 4,303,360 | 12/1981 | Cayen et al. | 409/233 |

FOREIGN PATENT DOCUMENTS

| | | | |
|---|---|---|---|
| 3408310 | 10/1984 | Fed. Rep. of Germany | 409/233 |
| 1451525 | 12/1966 | France | 409/233 |
| 45784 | 4/1977 | Japan | 409/233 |
| 24944 | 2/1984 | Japan | 409/233 |
| 73252 | 4/1984 | Japan | 409/234 |
| 524618 | 8/1976 | U.S.S.R. | 409/233 |

*Primary Examiner*—William R. Briggs
*Attorney, Agent, or Firm*—Fisher, Christen & Sabol

[57] ABSTRACT

The present invention relates to a safety tool-holder for machine-tools, comprising:
 a quill in which is axially cut a through-opening, said quill being mounted in a body integral with the machine-tool;
 a rod placed in the axial opening of the quill, a first end of which rod comprises gripping means adapted to grip a tool head, whereas the second end comprises a threaded portion;
 axial elastic return movement means, resting, first against the quill, and second, against a nut screwed on the threaded portion of the rod and making it possible to hold the latter in working position;
 means for continuously controlling the rod in its working position, which means detect the variation of the elastic deformation of the nut under the action of the elastic return means.

The invention finds an application in machine-tools, such as milling machines.

10 Claims, 5 Drawing Figures

SAFETY TOOL-HOLDER FOR MACHINE-TOOLS

The present invention relates to a tool-holder adapted to be mounted in the head of a machine-tool, comprising safety means and enabling the operator to have a continuous control over the value of the pressure necessary for the tool to remain in correct position in the tool-holder.

Said tool-holder is more specifically adapted for the electro-spindles of milling machines designed in particular for machining light alloys, such as aluminium.

The known electro-spindles for machine-tools are equipped with a tool-holder which comprises a quill inside which is placed a rod. One end of the quill is coneshaped and adapted to cooperate with a tool, such as a milling cutter, which is joined to one end of the rod by way of gripping means such as claws.

The tool-holder according to the prior art also comprises axial elastic return movement means resting, on the one hand against the quill, and on the other hand against a retaining nut screwed on a thread formed on the other end of the rod. The said elastic return movement means tend to compress the nut and thus to pull on the rod carrying the tool on its opposite end, thus keeping the rod in working position.

As a result, the tool cooperates completely with the cone formed in the end of the quill.

The rod is movable axially with respect to the quill between a first working position in which the tool is locked by the gripping means, and a second rest position in which the tool is unlocked, the gripping means then releasing the tool under the action of a jack actuating the rod.

When the tool works, the stresses to which it is subjected are counteracted by the wedging effect of the conical fit caused by the force exerted by the axial elastic return means. This type of tool-holder gives satisfactory results, particularly because of the simplified tool-changing operation; it has nevertheless a major disadvantage arising principally from the reliability of the axial elastic return means. Indeed, through frequent stresses and high compression loads, said elastic means, such as for example spring washers, become overstrained and loose their efficiency. Consequently, the force that they exert reduces with use, this releasing the hold on the rod supporting the tool. If the force exerted decreases, the contact of the tool with the cone of the quill is no longer complete and causes the appearance of a clearance between the tool and the cone. This results in an early wearing out of the tool and in a poor quality of the work produced.

Also, if the force exerted by the elastic means decreases rapidly (wearing out of one or more washers) the tool-holder and the cone of the quill can break, this creating greater risks, particularly for the operator, from the projection of pieces.

It is the object of the present invention to overcome these disadvantages by proposing a safety tool-holder for a machine-tool, which has retained all the qualities of the tool-holder described hereinabove, and which comprises means for permanently controlling the representative force exerted by the axial return elastic means.

To this effect, according to the invention, the safety tool-holder for machine-tool which comprises a quill in which a through opening is axially cut, said quill being mounted in a body forming part of the machine-tool, a rod placed in said axial through opening of the quill, a first end of said rod comprising gripping means adapted to hold a tool head whereas the second end of the rod comprises a thread, and said rod being movable axially with respect to said quill between a working position in which the tool is locked, and a rest position in which the tool is unlocked, axial elastic return mouvement means resting, on the one hand, against said quill, and on the other hand, against a nut screwed on the thread of the rod and making it possible to hold the rod in its working position, is remarkable in that it comprises means for continuously controlling said rod in its working position, said means comprising at least one gauge head disposed on the nut, electric supply and transmission means for said gauge head, processing means for the signals delivered by said gauge head, and means for displaying said signals, in order to detect the variation of the elastic deformation of the nut under the action of the elastic return means.

More specifically, the gauge head is composed of resistive strain gauges, adhesively fixed on the nut which is advantageously produced in a material having sufficient elastic characteristics to deform under low compression forces.

According to another characteristic of the invention the signals supply and transmission means are constituted by a rotating collector composed mainly of a rotor, of brushes and brush-holders supplying said gauges via electrical connections and transmitting the received signals to the processing means. Advantageously, the electrical connections connecting the gauges to the collector are protected by a housing fixed on the quill.

The invention will be more readily understood on reading the following description with reference to the accompanying drawings, in which.

Figure 1:
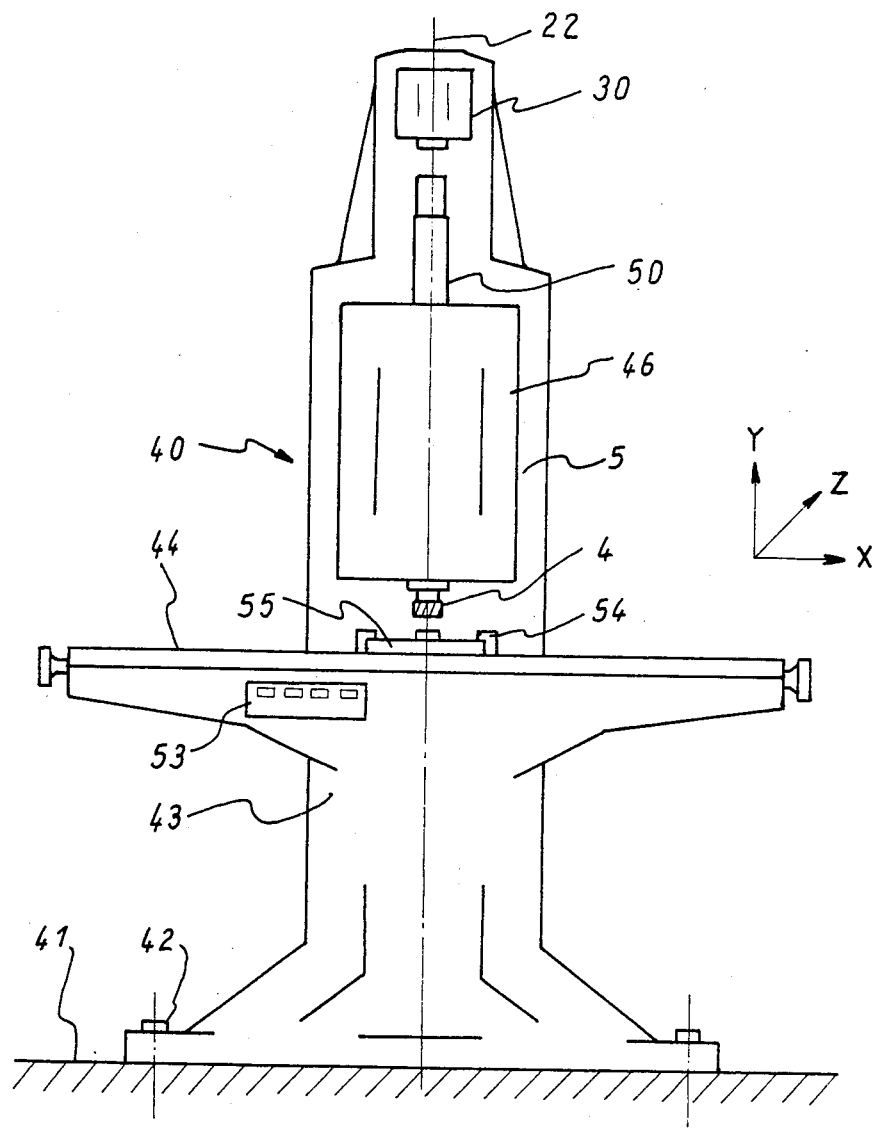
FIG. 1 is a diagrammatical view of a machine-tool, such as a milling machine, equipped with a tool-holder.

Referring first to FIG. 1, this diagrammatically shows a milling machine 40 which is fixed on the ground 41 by screws 42. Said milling machine comprises a structure 43 supporting a work table 44 which is adapted to move along three coordinates X, Y, Z, for example with the aid of electrical means moving endless screws, not shown in the figure.

An upper body 5 is integral with the support structure 43 inside which is mounted an electro-spindle 46 containing a tool-holder 50 around an axis 22, and of which one end supports a tool 4 such as a milling cutter.

Thrust means 30 illustrated by an electro-mechanical jack are provided above the upper body supporting the electro-spindle, co-axially with respect to axis 22. A control box 53 gives the different instructions necessary for the good operation of the machine (displacements of the table, rotation, stoppage of the electro-spindle . . . ). The work table 44 comprises for example clamping flanges 54 for securing in position the part to be machined 55.

Figure 2:
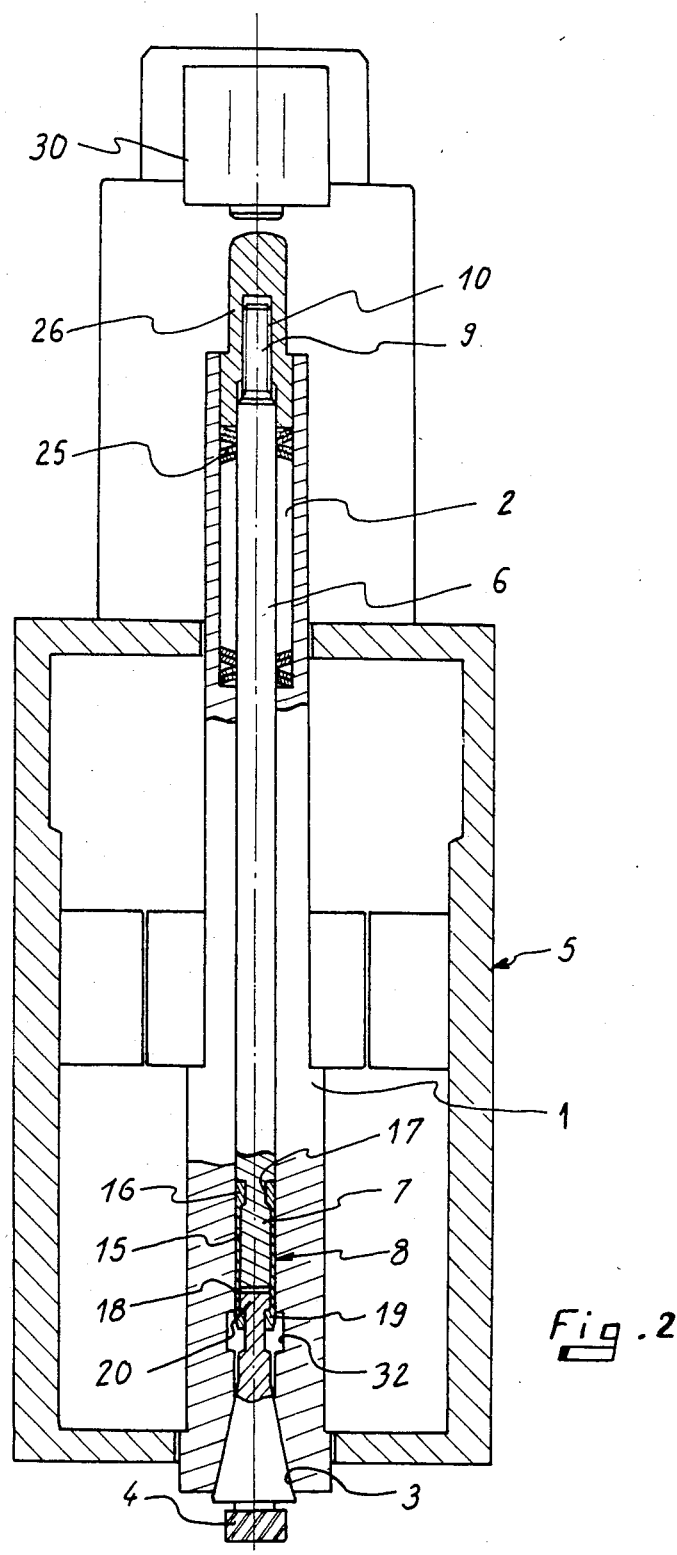
FIG. 2 is a cross-sectional view of a tool-holder according to the prior art.
Figure 3:
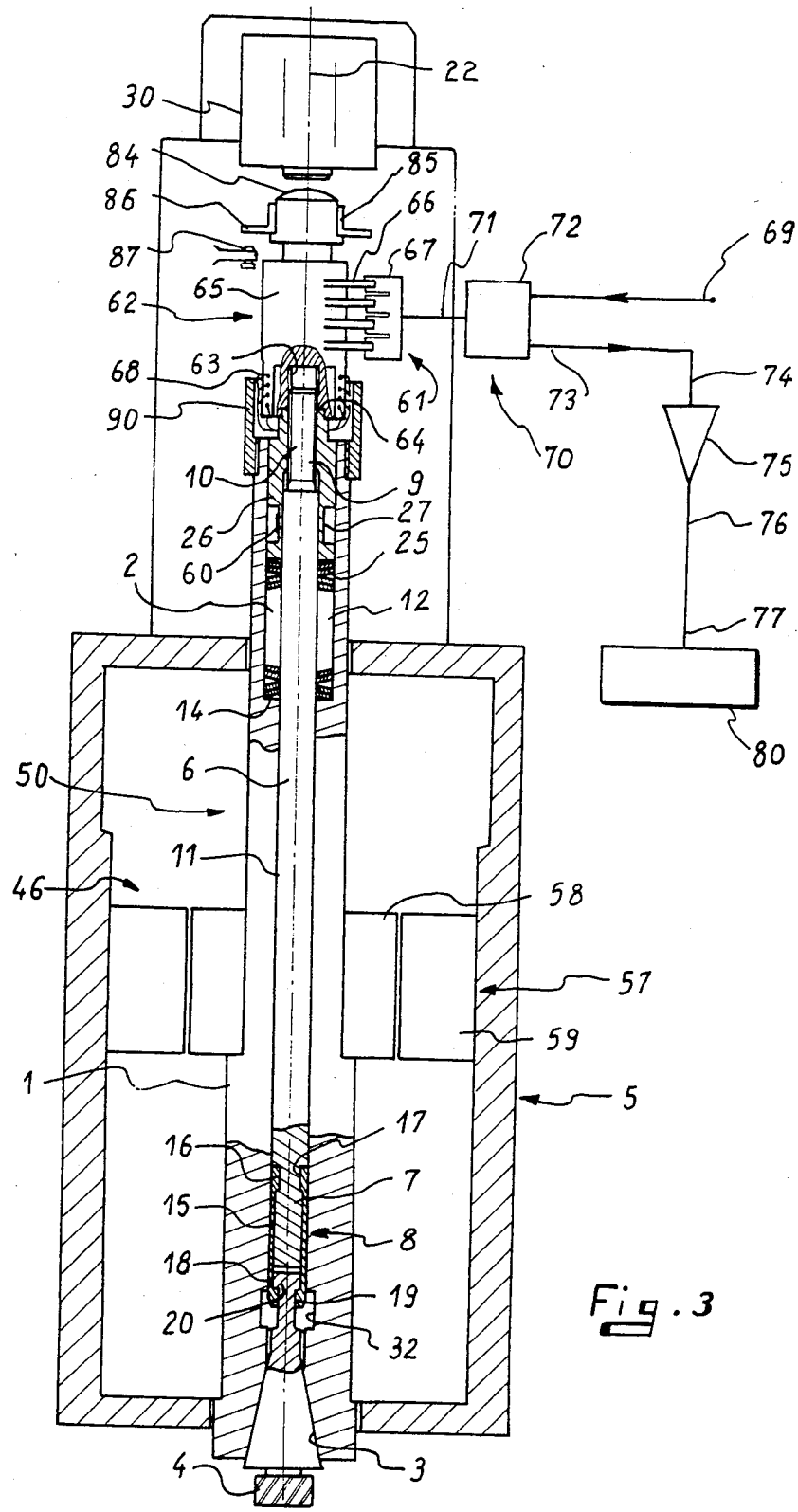
FIGS. 3 and 4 are cross-sectional views of the tool-holder according to the invention, in working position and in rest position, respectively.
Figure 4:
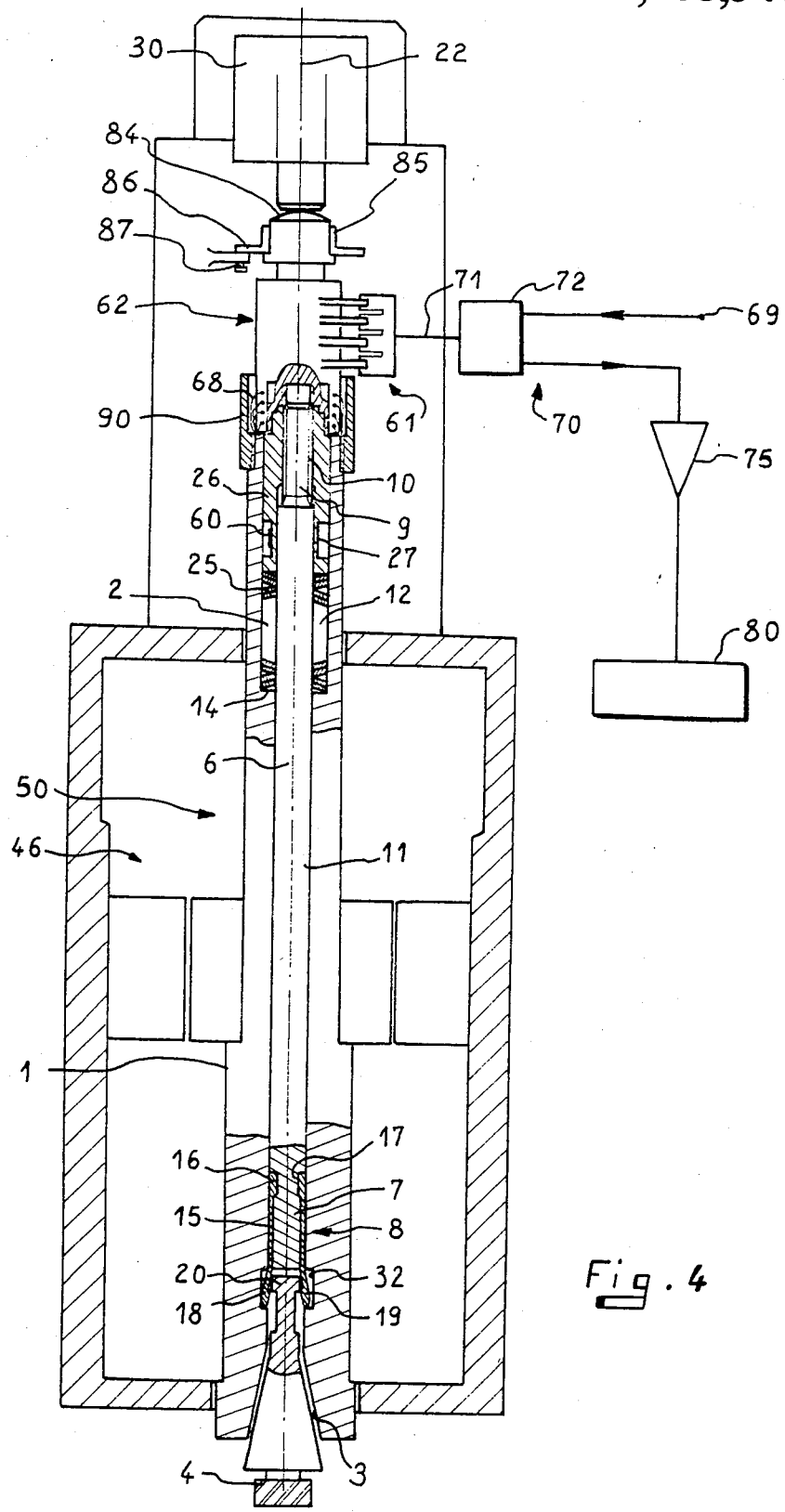
Figure 5:
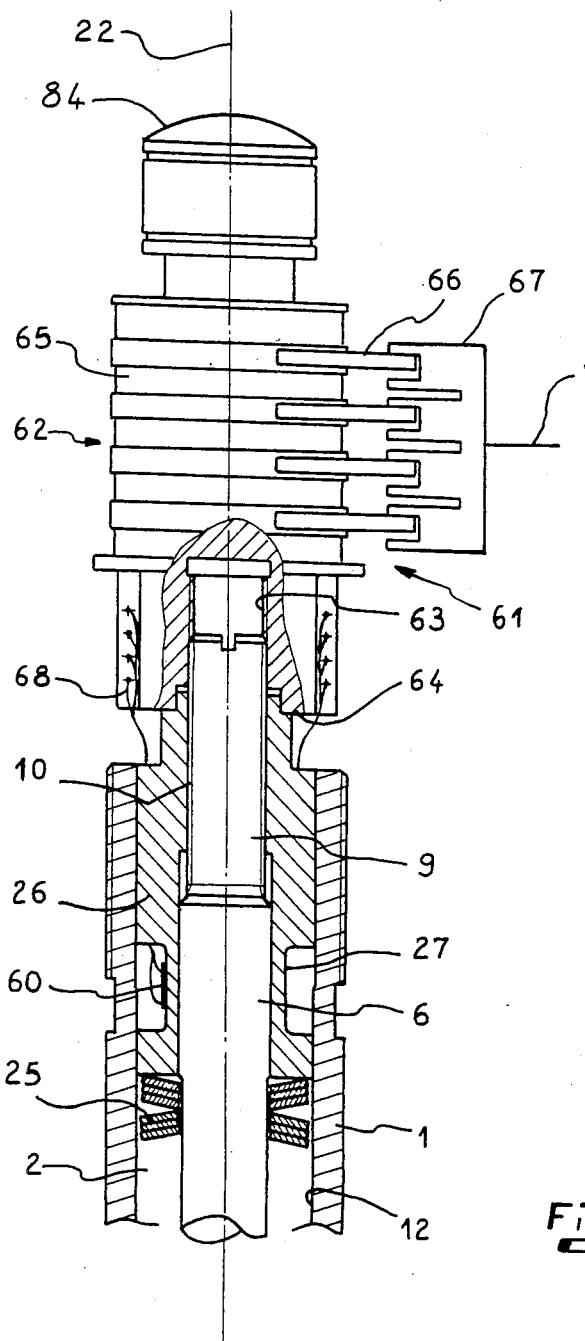
FIG. 5 is an enlarged partial view in cross-section of the tool-holder according to the invention.

FIG. 2 shows a cross-section of a tool-holder according to the prior art, which will now be described in comparison to FIGS. 3 and 4 which illustrate the tool-holder according to the invention, first in its working position with the tool locked (FIG. 3), and second, in its rest position with the tool unlocked (FIG. 4).

Said tool-holder comprises a quill 1 in which is axially cut a through-opening 2 defined by two co-axial bores 11 and 12 of different diameter, bore 11 having the smallest diameter. The difference in diameter between bores 11 and 12 is represented inside the quill by an internal shoulder 14; bore 11 of said quill ends into a conical portion 3 adapted to receive the corresponding conical part of the working tool 4.

The quill 1 is incorporated in the body 5 (diagrammatically shown in FIGS. 2,3 and 4)integral with the support structure 43 of the machine-tool. An electric motor 57 is mounted between the quill 1 which receives the rotor 58 and the body 5 which receives the stator 59 of said motor.

A rod 6 is placed in the axial opening 2 of which the diameter is substantially equivalent to that of the bore with the smallest diameter 11. Said rod comprises, at its lower end 7 situated close to the conical end 3 of the quill, gripping means 8 defined by a ring 15 of which a first end 16 is forced-fitted in a groove 17 formed in the rod 6, whereas the second end 18 is equipped with elastic claws or clamps 19 which are protruding with respect to the end 7 of the rod. Said claws 19 can occupy two positions as explained hereinafter.

Rod 6 comprises at its opposite end 9, a threaded portion 10. Said rod is adapted to move axially with respect to the quill 1, between a first working position (FIG. 3) in which the claws 19 resiliently grip the head 20 of the tool 4, and a second rest position (FIG. 4) in which the claws 19 are resiliently set apart one from the other, to release the head of the tool. Said claws then engage into a notch 32 cut in the axial opening 2, precisely above the conical end 3 of the bore 11.

The first working position corresponds to the tool being locked, and the second rest position corresponds to the tool being unlocked.

Said tool-holder 50 further comprises elastic return means 25 constituted by a stack of spring washers of the "Belleville" or "Schnorr" type, resting first against the internal shoulder 14 and also against a retaining nut 26 screwed on the threaded portion 10 of the end 9 of the rod 6. The spring washers 25 and nut 26 are placed in the bore 12 of larger diameter of the axial opening. These means 25 make it possible to keep the rod 6 in its working position by pulling the tool against the conical end 3, thanks to the gripping means 8 provided on the end 7 of the rod 6. Said means 25 tend to compress the retaining nut 26 under the pulling effect produced by the spring washers.

According to the invention, means are provided for continuously controlling the rod in its working position, this being achieved by measuring the variation of the compressive force of the nut and more specifically, the variations in the dimensions of the nut which variations are proportional to the force exerted by the spring washers on the nut.

Consequently, if the force exerted by the spring washers decreases for reasons of strain, wear or ageing, the said continuous control means will detect these various anomalies.

Advantageously, the retaining nut 26 is produced in a material having resilient characteristics capable of deforming under low compression stresses, such as a steel.

Said control means comprise for example, a gauge head constituted by resistive strain gauges 60 adhesively fixed in a notch 27 provided on the nut 26, electric supply and transmission means 61, processing means 70 for the signals produced by the strain gauges and display means 80 for displaying the measured value of the force exerted.

Due to the rotation about axis 22 of the electro-spindle in working position, of the assembly constituted mainly of the quill 1, the rod 6 and the nut 26, the signals supply and transmission means 61 comprise a rotating collector 62 screwed in the end of the rod 6 by way of a tapped hole 63 made in one face 64 of the collector, said face coming substantially in contact with the upper end of the nut 26. Succinctly, the collector comprises a rotor 65 equipped with brushes 66 which co-operate with brush-holders 67 provided on the body 5.

Moreover, said collector is connected to the strain gauges 60 via connecting wires 68, whereas the brush-holders 67 which receive the signals transmitted by the collector, are connected to the signals processing means 70 via a connection 71. Said processing means 70 comprise, in particular, a signal distributor 72, which selects and processes the signals issued, first from the general power supply 69, and second, from the strain gauges 60 via collector 62.

Output 73 of the distributor is connected to the input 74 of an amplifier 75 of which the output 76 is connected to the input 77 of the display means 80 constituted by a digital type display unit, for example with electroluminescent diodes.

The initially displayed value represents the compression force exerted on the nut 26 by the spring washers 25.

In addition, collector 62 is provided at its end 84, opposite to that which comes substantially in facing relationship to the nut 26 by its face 64, with a ring 85 comprising a flange 86 adapted to contact with a position sensor 87 integral with the body 5 of the machine-tool, by way of an electro-mechanical type jack 30. Said jack is also fixed to the body 5, in the axis 22 of the electro-spindle 46, and is thus co-axial to the assembly constituted by the quill 1, the rod 6, the nut 26 and the collector 62. The head of the piston of said jack faces the end 84 of the collector.

Advantageously, the connecting wires 68, connecting gauges 60 to collector 62 are protected by a protective housing 90 mounted by screwing on the upper end of quill 1.

Said tool-holder works as explained hereinafter in reference to FIGS. 3 and 4 which illustrate the two outermost operational positions mentioned hereinabove. The operator introduces the conical part of the tool 4 into the conical end 3 of the quill 1 with which it cooperates completely, until the tool head rests against the end 7 of the rod 6 which, as a result, moves upward with respect to axis 22. The gripping means 8, and in particular the claws 19, leave the notch 32 provided in the axial opening 2 and close over the milling head, gripping it due to the section difference between the notch 32 and the first bore 11. In a preliminary adjusting operation, the operator screws the retaining nut 26 on the threaded portion 10 of rod 6, using a dynamometric spanner, until a certain pre-calculated value Vo is reached, the nut, in its helical movement, compressing the spring washers 25. The value of the screwing pressure applied on the nut represents the mechanical strength of the spring washers.

The operator reads the value Vo displayed by the digital display means 80 receiving the electrical signals issued from the strain gauges 60 which are adhesively fixed on the nut and from the means processing (70) and transmitting (61) said signals. All of said means having been calibrated beforehand.

Having completed the different adjustments relative to the machining of the part, the operator then starts the motor 57 driving the electro-spindle 46, thus initiating the rotation about axis 22 of the assembly constituted of the quill 1, the rod 6, the nut 26, the collector 62 and the tool 4.

The operator can check on the digital display means 80, any variation of the value Vo initially displayed by means of the signals transmitted by the strain gauges 60 which measure continuously the compression and expansion of the part of the nut where they are adhesively fixed, said signals representing the force exerted on the support face of the retaining screw 26 by the stack of washers 25.

Understandably, the displayed value Vo is a maximum value of initial calibration which can only decrease, due to straining and mechanical wearing of the spring washers, and it is precisely this eventual reduction of said force which is measured.

In the case of a loss of efficiency noted in the washers 25 (straining, starting of cracks, . . . ) the operator is warned by the digital display means 80, which deliver a value Vo-v, which may be coupled to a sound or light signalling device, in order to increase safety to a maximum. In the case of a sudden drop in the force exerted by the spring washers, this creating an important decompression of the nut 26, the value transmitted by the gauges to the display means indicates a minimum value Vo-v lower than an accepted threshold of tolerance, and initiates the immediate stoppage of the spindle.

It must be specified that such continuous control means are advantageous for preventing an incorrect fastening of the tool, not only during the rotation of the electro-spindle, but also during any stoppage, even prolonged, of the machine-tool.

The operator, when he arrives at his working station, may find that the digital display means give a value which is less than the reference value (optionally completed with a sound or light signal), and then he may make the decision to have the spring washers changed.

This change is carried out, with the electro-spindle in stop position, by removing the protective housing 90 and unscrewing the retaining nut 26 with a dynamometric spanner.

Before mounting the nut against the new set of spring washers in the bore 12 of the axial opening 2 of the quill 1, it is important to control the calibration of such mounting by indicating for example a value O in the display means 80. The nut 26 is tightened with the spanner until the initial calibration value Vo is reached.

Dismounting of the tool according to the invention is carried out with the electro-mechanical jack 30 which is worked by the operator and of which the piston is brought into contact with the end 84 of the collector 62 driving downwards the assembly constituted by the nut 26, the rod 6 and the tool 4 while compressing the spring washers 25.

Understandably, the force delivered by the jack is greater than that exerted by the spring washers. Thus, the claws 19 of the gripping means 8 move progressively apart, returning elastically to their original position inside the notch 32 of the quill 1 which remains fixed in translation with respect to axis 22. At that moment, the operator removes the tool 4 from the tool-holder, for example to change the tool. Before the operator's intervention, the flange 86 of the ring 85 which is joined to the collector 62, has, during the downward movement of the aforementioned assembly, come into contact with the position sensor 87 integral with the body 5, thus stopping the rotation of the electro-spindle while the tool-holder is in unlocked position.

Compared to what has been described hereinabove, the advantages offered by such a tool-holder equipped with continuous control means, optimize not only the quality of the work produced, by avoiding rejects of parts, and the maintenance operations, but also the security of the operators.

It is also possible, without departing from the scope of the invention, to connect the strain gauges directly to the signal processing means without using a collector, in the case of a machine-tool in which the tool works in translation for example.

I claim:

1. Safety tool-holder for machine-tool, of the type comprising:
   a quill in which is axially cut a through-opening, said quill being mounted in a body integral with the machine-tool;
   a rod placed in said axial opening of the quill, a first end of said rod comprising gripping means adapted to grip a tool head, the second end of said rod having a threaded portion, and said rod being axially movable with respect to said quill between a working position in which the tool is locked, and a rest position in which the tool is unlocked;
   axial elastic return movement means, resting first against the quill and second, against a nut screwed on the threaded portion of said rod and making it possible to keep said rod in its working position, tool-holder wherein means are provided for continuously monitoring the rod in its working position, said means being composed of at least one elastic deformation sensor disposed on said nut, electric supply and transmission means for said sensor, means for processing the signals produced by said sensor, and means for displaying said signals, in order to detect the variation of the elastic deformation of the nut under the action of the elastic return means.

2. Safety tool-holder as claimed in claim 1, wherein said sensor is constituted by resistive strain gauges which are adhesively fixed on said nut.

3. Tool-holder as claimed in claim 1, in which the quill and the rod are co-axial one with respect to the other and adapted to be driven in rotation, wherein the signals supply and transmission means are constituted by a rotating collector composed mainly of a rotor, brushes and brush-holders, supplying said gauges by way of electrical connections and transmitting the received signals to the processing means.

4. Tool-holder as claimed in claim 1, wherein said rotating collector is secured by one of its ends to said rod so as to come substantially in contact with said nut.

5. Tool-holder as claimed in claim 1, wherein said signals processing means are constituted by a distributor and by an amplifier.

6. Tool-holder as claimed in claim 1, wherein said display means are constituted by a digital-type display unit with electroluminescent diodes, the value initially displayed representing the compression strain to which the elastic return means are subjected through the nut.

7. Tool-holder as claimed in claim 1, wherein said nut is produced in a material having elastic characteristics and being capable of deforming under low compression forces.

8. Safety tool-holder as claimed in claim 1, wherein said tool-holder comprises a ring having a flange, which ring is placed on the end opposite that which is screwed on the threaded portion of the rod, and said ring being adapted to come into contact with a position sensor which is fast with said body, under the action of an electro-mechanical jack co-axially mounted above the assembly constituted by the collector, the nut and the rod, and capable of unlocking said tool.

9. Safety-holder as claimed in claim 1, wherein a protective housing is fixed on said quill to protect the wires connecting the strain gauges to the collector.

10. Machine-tool wherein at least one tool-holder such as defined in claim 1 is provided.

* * * * *